(12) United States Patent
Migaki et al.

(10) Patent No.: US 10,457,238 B2
(45) Date of Patent: Oct. 29, 2019

(54) IMPACT ABSORBER

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Yohei Migaki, Aichi-ken (JP); Manabu Kawaguchi, Aichi-ken (JP); Mitsuaki Eshima, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/909,599

(22) Filed: Mar. 1, 2018

(65) Prior Publication Data

US 2018/0257597 A1 Sep. 13, 2018

(30) Foreign Application Priority Data

Mar. 10, 2017 (JP) .................................. 2017-045838

(51) Int. Cl.
*B60J 5/00* (2006.01)
*B60R 21/04* (2006.01)
(Continued)

(52) U.S. Cl.
CPC ...... *B60R 21/0428* (2013.01); *B60R 13/0243* (2013.01); *F16F 7/12* (2013.01);
(Continued)

(58) Field of Classification Search
CPC .. F16F 7/12; F16F 7/121; B60R 21/04; B60R 21/34
(Continued)

(56) References Cited

U.S. PATENT DOCUMENTS 5,636,866 A * 6/1997 Suzuki .................... B60R 21/04
188/376
5,806,889 A * 9/1998 Suzuki .................... B60R 21/04
280/748

(Continued)

FOREIGN PATENT DOCUMENTS

| JP | H7-164878 | 6/1995 |
| JP | H8-310321 | 11/1996 |
| JP | 5125704 | 1/2013 |

OTHER PUBLICATIONS

Japanese Office Action in counterpart Japanese Application No. 2017-045838, dated Jul. 30, 2019 (along with English-language translation).

*Primary Examiner* — Christopher P Schwartz
(74) *Attorney, Agent, or Firm* — Greenblum & Bernstein, P.L.C.

(57) ABSTRACT

An impact absorber to be mounted between a vehicular panel and a vehicular interior part covering the vehicular panel from a vehicular interior side includes an opposite wall to be opposite the vehicular panel, outer walls extending from edges of the opposite wall toward a vehicular interior side, and an extended wall extending from the opposite wall toward the vehicular interior side and having a side edge connected to the one outer wall, and the extended wall having a thickness that is increased from a vehicular interior end thereof toward a vehicular exterior end thereof, and the extended wall having a cutout hole that is open toward a vehicular exterior side.

17 Claims, 8 Drawing Sheets

(51) Int. Cl.
*F16F 7/12* (2006.01)
*B60R 13/02* (2006.01)
*B60R 21/00* (2006.01)

(52) U.S. Cl.
CPC .............. *B60R 2021/0006* (2013.01); *B60R 2021/0055* (2013.01); *B60R 2021/0414* (2013.01); *F16F 2224/0233* (2013.01); *F16F 2226/04* (2013.01); *F16F 2230/0023* (2013.01)

(58) Field of Classification Search
USPC .................. 296/146.6, 146.7; 293/132, 133; 280/748, 750, 751; 188/377; 267/152, 267/153
See application file for complete search history.

(56) References Cited

U.S. PATENT DOCUMENTS

| | | | | |
|---|---|---|---|---|
| 5,857,702 | A * | 1/1999 | Suga | B60J 5/0451 188/377 |
| 6,203,096 | B1 * | 3/2001 | Noda | B60J 5/0451 280/751 |
| 7,997,637 | B2 * | 8/2011 | Suzuki | B60R 21/0428 296/146.7 |
| 8,215,699 | B2 * | 7/2012 | Suzuki | B60J 5/0451 296/146.6 |
| 8,960,774 | B2 * | 2/2015 | Sakhare | B62D 25/02 280/748 |
| 2009/0250966 | A1 | 10/2009 | Suzuki et al. | |

* cited by examiner

IMPACT ABSORBER

CROSS REFERENCE TO RELATED APPLICATION

This application claims priority from Japanese Patent Application No. 2017-45838 filed on Mar. 10, 2017. The entire contents of the priority application are incorporated herein by reference.

FIELD OF THE INVENTION

The present disclosure relates to an impact absorber.

BACKGROUND

An impact absorber mounted in a vehicle has been known and such an impact absorber includes extended walls (ribs). The extended walls are buckled and deformed to absorb impact caused by a side collision.

As the extended walls are buckled and deformed greatly due to the side collision, the extended walls that are bent may be contacted with each other and the buckling deformation is less likely to effectively occur and impact absorbing performance may be lowered.

SUMMARY OF THE INVENTION

An objective of the present technology is to provide an impact absorber that can improve impact absorbing performance in case of side collisions.

An impact absorber according to the present technology is to be mounted between a vehicular panel and a vehicular interior part covering the vehicular panel from a vehicular interior side, and the impact absorber includes an opposite wall to be opposite the vehicular panel, outer walls extending from edges of the opposite wall toward a vehicular interior side, and an extended wall extending from the opposite wall toward the vehicular interior side and having a side edge connected to the one outer wall, and the extended wall having a thickness that is increased from a vehicular interior end thereof toward a vehicular exterior end thereof, and the extended wall having a cutout hole that is open toward a vehicular exterior side.

DETAILED DESCRIPTION OF EMBODIMENTS

<First Embodiment>

Figure 1:
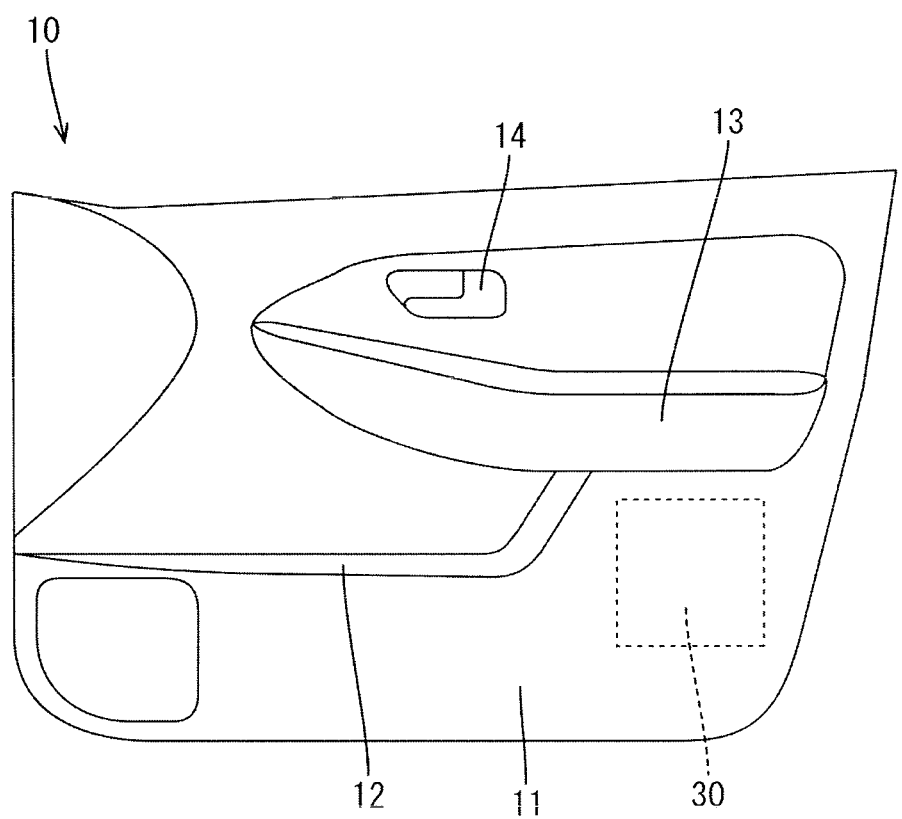
FIG. 1 is a front view of a vehicular door trim according to a first embodiment of the present technology.

A first embodiment of the present technology will be described with reference to FIGS. 1 to 7. FIG. 1 is a front view illustrating a vehicular door trim 10. The door trim 10 configures a part of a vehicular side door and includes a trim board 11 including a door pocket 12, an armrest 13, and an inside handle 14, as illustrated in FIG. 1. As illustrated in FIG. 5, the trim board 11 (a vehicular interior part) is mounted to cover an inner panel 15 (an example of a vehicular panel) from a vehicular interior side.

An impact absorber 30 is mounted on a vehicular exterior side surface 11A of the trim board 11. As illustrated in FIG. 5, the inner panel 15 has a service hole 15A opposite the impact absorber 30. An operator performs mounting operations and maintenance operations of functional components mounted on the side door through the service hole 15A. A service hole cover 16 (an example of a vehicular panel) is mounted to cover the service hole 15A from the vehicular interior side. The impact absorber 30 is between the trim board 11 and the service hole cover 16. The service hole cover 16 is a plate made of synthetic resin such as polypropylene and is fixed to the inner panel 15 with screws.

Figure 2:
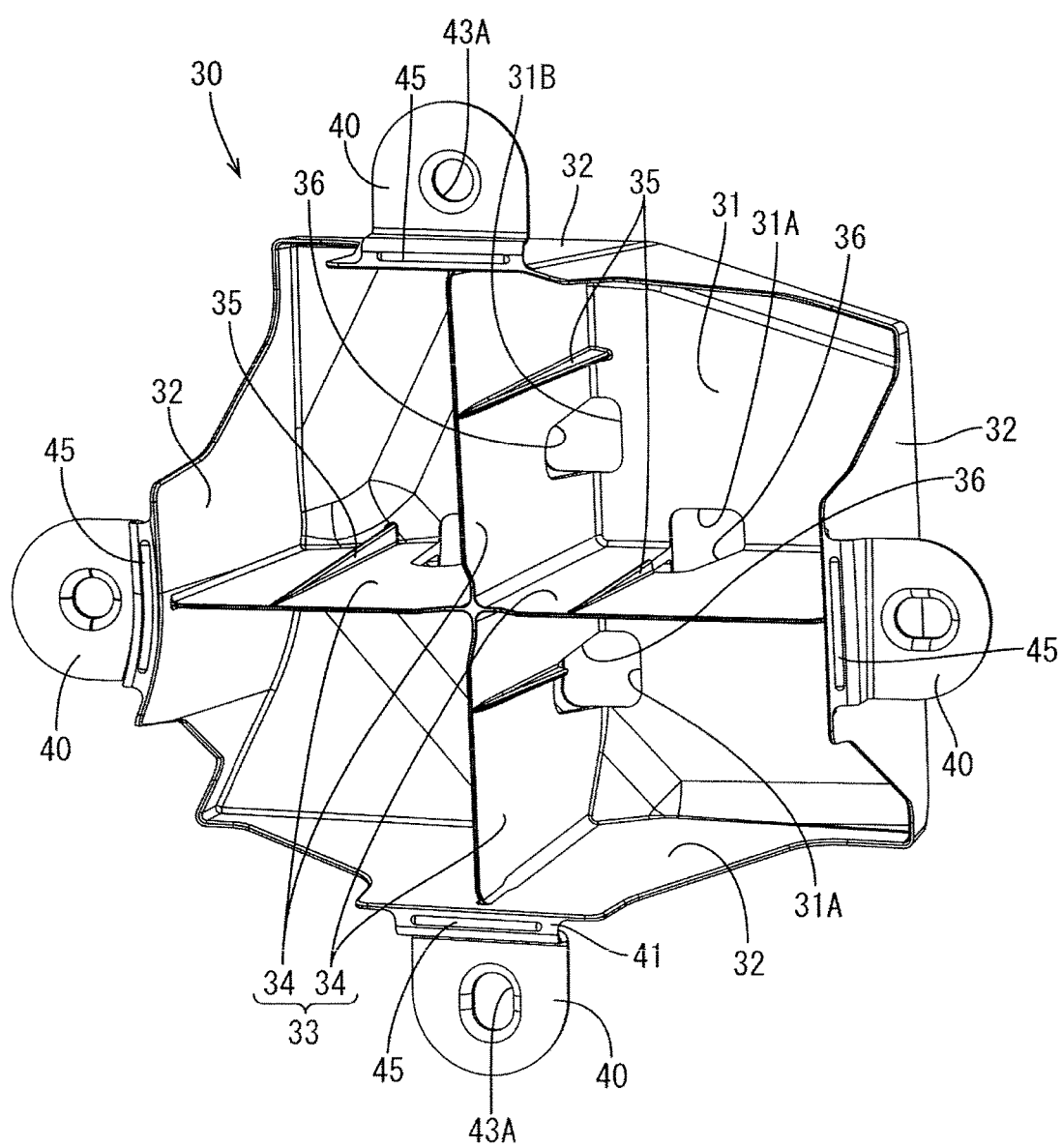
FIG. 2 is a perspective view of an impact absorber according to the first embodiment seen from a vehicular interior side.

The impact absorber 30 is arranged in a section of the trim board 11 opposite a hip of a passenger who is seated on a vehicular sheet (not illustrated) as illustrated with a dotted line in FIG. 1. As illustrated in FIG. 2, the impact absorber 30 has a box shape, as a whole, opening toward the vehicular interior side. The impact absorber 30 is produced with injection molding and made of synthetic resin such as polypropylene. Molding dies for producing the impact absorber 30 is opened and closed in a horizontal direction (a vehicular interior-exterior direction) in FIG. 5.

As illustrated in FIGS. 2 and 5, the impact absorber 30 includes an opposite wall 31 (top plate), outer walls 32 of four, an extended wall 33, and mounting portions 40. The opposite wall 31 is opposite the service hole cover 16. The four outer walls 32 extend from edges of the opposite wall 31 toward the vehicular interior side. The extended wall 33 extends from the opposite wall 31 toward the vehicular interior side. The mounting portions 40 are included at the respective outer walls 32.

Figure 3:
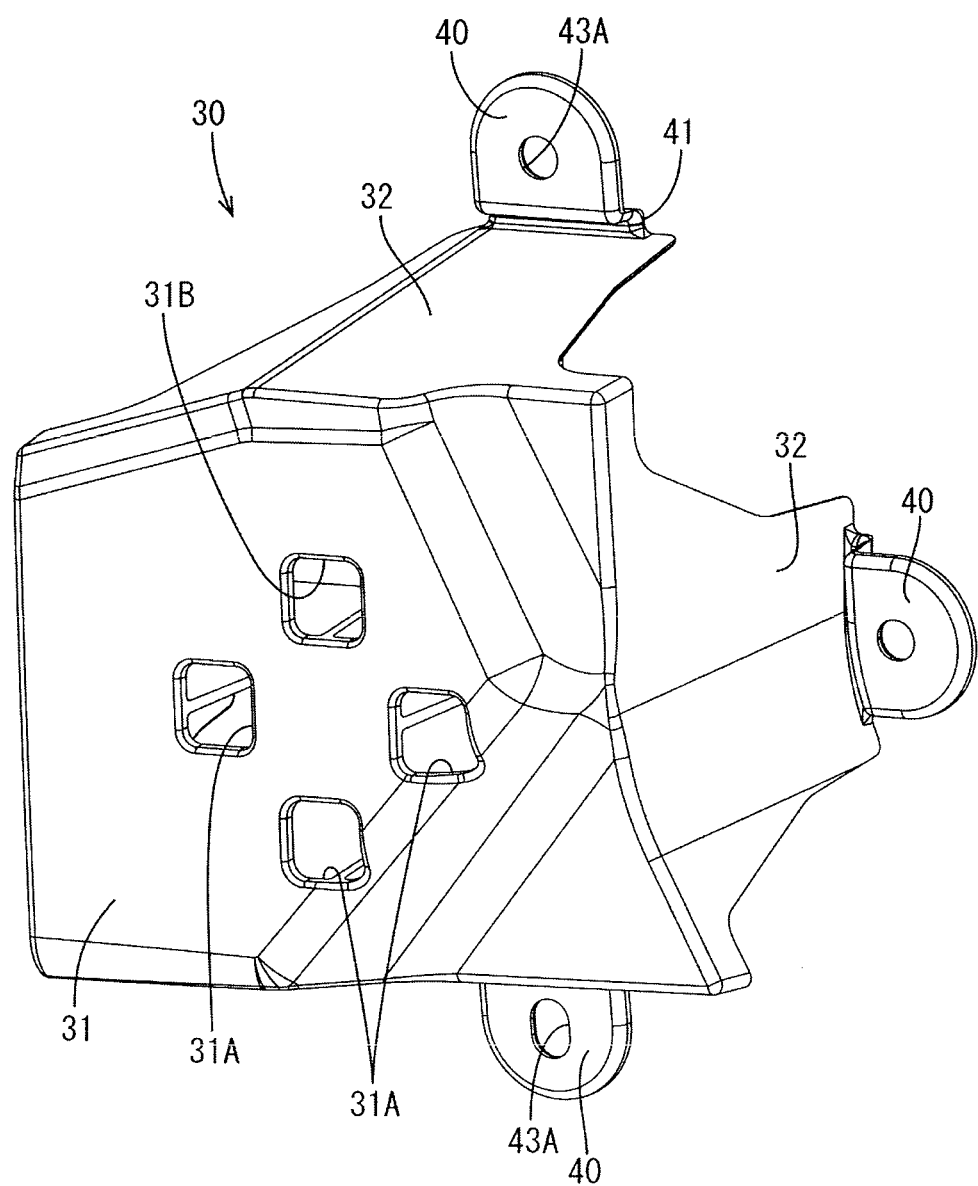
FIG. 3 is a perspective view of the impact absorber according to the first embodiment seen from a vehicular exterior side.
Figure 4:
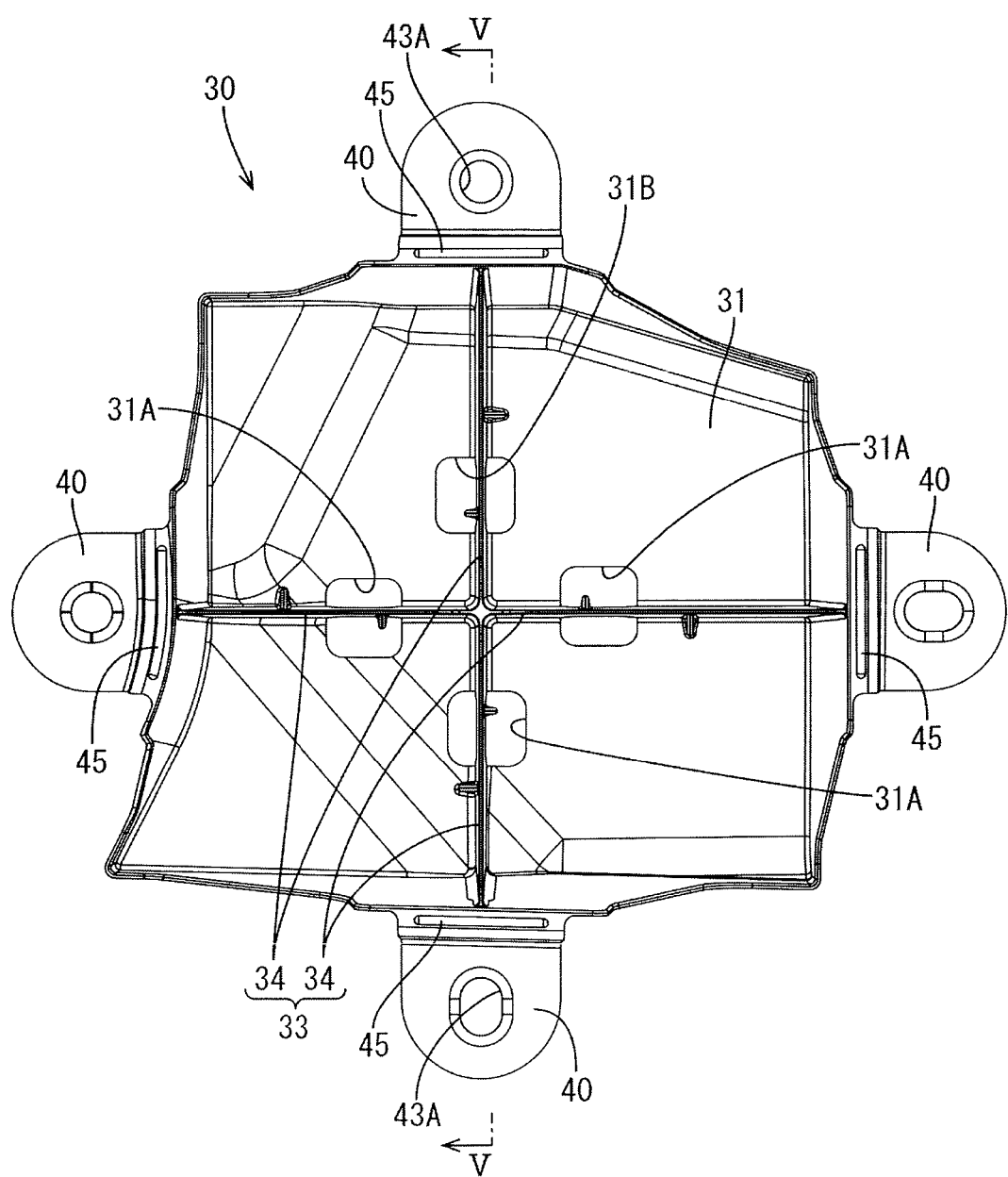
FIG. 4 is a front view of the impact absorber seen from the vehicular interior side.
Figure 5:
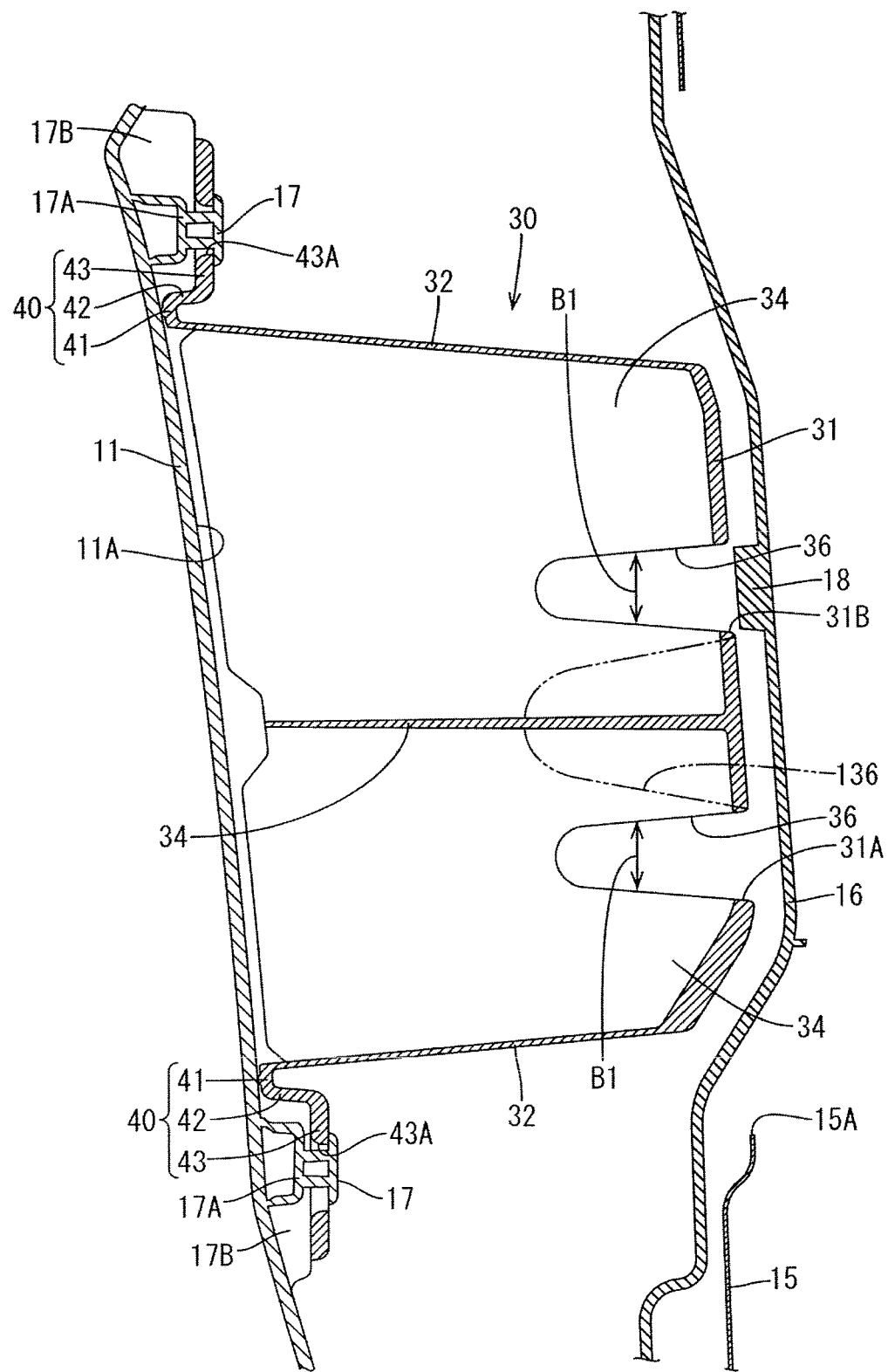
FIG. 5 is a cross-sectional view of the impact absorber taken along line V-V in FIG. 4.

As illustrated in FIG. 4, the opposite wall 31 has a substantially square shape in a front view or seen from the vehicular interior side. The opposite wall 31 configures a vehicular exterior side edge portion of the impact absorber 30. The outer walls 32 extend from the respective four sides of the opposite wall 31 toward the vehicular interior side. As illustrated in FIGS. 2 and 3, each of the outer walls 22 has a width that is decreased as it extends toward the vehicular interior side or closer to the mounting portion 40. Each of the outer walls 22 has a thickness that is constant along the vehicular interior-exterior direction. As illustrated in FIG. 4, the extended wall 33 includes four ribs 34 that are connected to each other in a form of a cross shape in a plan view.

As illustrated in FIG. 2, each of the ribs 34 is perpendicular to its adjacent outer wall 32 and one end of each rib 34 (an outer wall 32 side end) is connected to the adjacent outer wall 32. As illustrated in FIG. 5, each rib 34 is thicker as it extends from a vehicular interior side end thereof toward a vehicular exterior side. Each rib 34 includes a reinforcing rib 35 on a surface thereof and the reinforcing rib 35 extends in the vehicular interior-exterior direction. A vehicular exterior side end of the reinforcing rib 35 is connected to the opposite wall 31. Each rib 34 has a cutout hole 36 that is through the thickness of the rib 34 and open toward the vehicular exterior side. The cutout hole 36 is open at a vehicular exterior end of the rib 34 and an opening width of the cutout hole 36 is increased as is closer to the vehicular exterior side (a right side in FIG. 5) as illustrated in FIG. 5. As illustrated in FIG. 2, the opposite wall 31 has through holes 31A corresponding to the respective cutout holes 36 to be communicated with the cutout holes 36.

Figure 6:
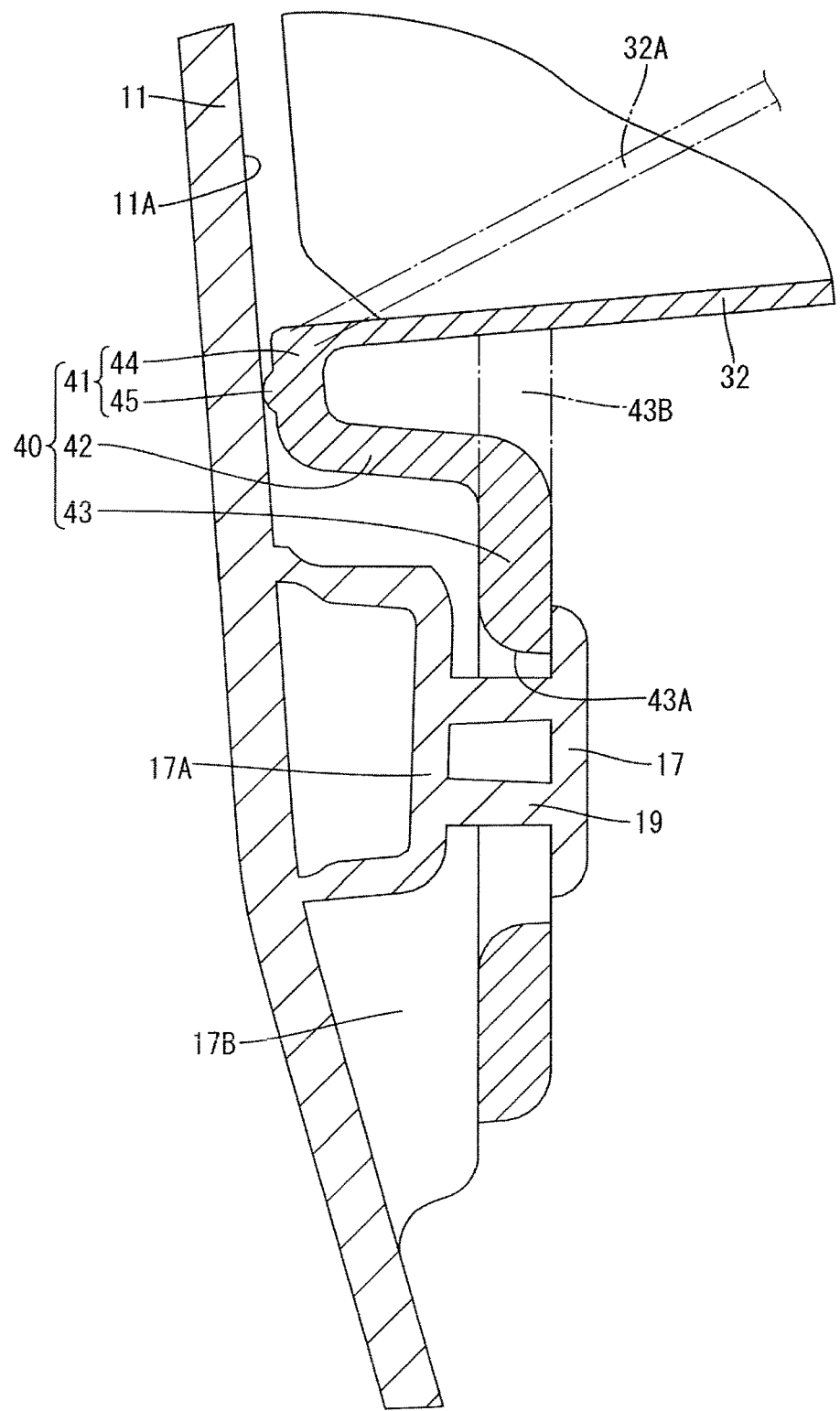
FIG. 6 is an enlarged cross-sectional view illustrating a portion near a mounting portion in FIG. 5.

As illustrated in FIG. 5, the trim board 11 includes mounting bosses 17 on a vehicular exterior side surface 11A and the mounting portions 40 are mounted in the respective mounting bosses 17. As illustrated in FIG. 6, the mounting portion 40 is included at a vehicular interior side end of each outer wall 32 and includes a basal portion 41, a distal end portion 43 (a securing portion), and an intermediate portion 42 connecting the basal portion 41 and the distal end portion 43. The basal portion 41 is at a vehicular interior end of the outer wall 32 and contacted with a vehicular exterior side surface of the trim board 11. One end of the basal portion 41 is connected to the outer wall 32 and another end of the basal portion 41 is continuous to the intermediate portion 42. The intermediate portion 42 extends from the other end of the basal portion 41 toward the vehicular exterior side and continuous to the distal end portion 43. The distal end portion 43 is on the vehicular exterior side with respect to the basal portion 41 and fastened with the mounting boss 17.

As illustrated in FIG. 6, the basal portion 41 includes a plate portion 44 and a contact rib 45. The plate portion 44 extends along the vehicular exterior surface 11A of the trim board 11. The contact rib 45 is included on a vehicular interior side surface of the plate portion 44 and has an elongated shape extending along the vehicular interior side end of the outer wall 32. The contact rib 45 projects toward the vehicular interior side or toward the trim board 11. A projected end of the contact rib 34 is in contact with the vehicular exterior surface 11A. The distal end portion 32 has an insertion hole 43A through which the mounting boss 17 is inserted.

A distal end of each mounting boss 17 is fixed to a hole edge of each insertion hole 43A with welding (thermal caulking) such as ultrasonic welding. Thus, the impact absorber 30 is fixed to the trim board 11. As illustrated in FIG. 6, the trim board 11 includes an impact absorber mounting portions 19. Each of the impact absorbing mounting portions 19 includes the mounting boss 17, a base member 17A, and a contact rib 17B. The base member 17A is on the vehicular exterior surface 11A and the mounting boss 17 projects from a vehicular exterior side surface of the base member 17A toward the distal end portion 43 or toward the vehicular exterior side. The contact rib 17B projects from the vehicular exterior surface 11A near the base member 17A. The contact rib 17B is to be in contact with the distal end portion 43 from the vehicular interior side.

The mounting boss 17, the base member 17A, and the contact rib 17B are formed integrally with the trim board 11. The impact absorbing mounting portion 19 may not include the base member 17A and the mounting boss 17 may be directly provided on the trim board 11.

In this embodiment, one of the four through holes 31A formed in the opposite wall 31 is disposed on the most upper side when the shock absorber 30 is fixed to the trim board 11 (see FIG. 3) and the most upper side one is referred to as the through hole 31B (a fitting portion). As illustrated in FIG. 5, the through hole 31B is opposite a projection 18 formed on the service hole cover 16 (one of the opposite wall and the vehicular panel). The projection 18 projects from the service hole cover 16 toward the through hole 31B and the projection 18 and the through hole 31B overlap with each other seen from the vehicular interior side. In this embodiment, the projection 18 overlaps the through hole 31B in the vehicular interior-exterior direction (the horizontal direction in FIG. 5).

Figure 7:
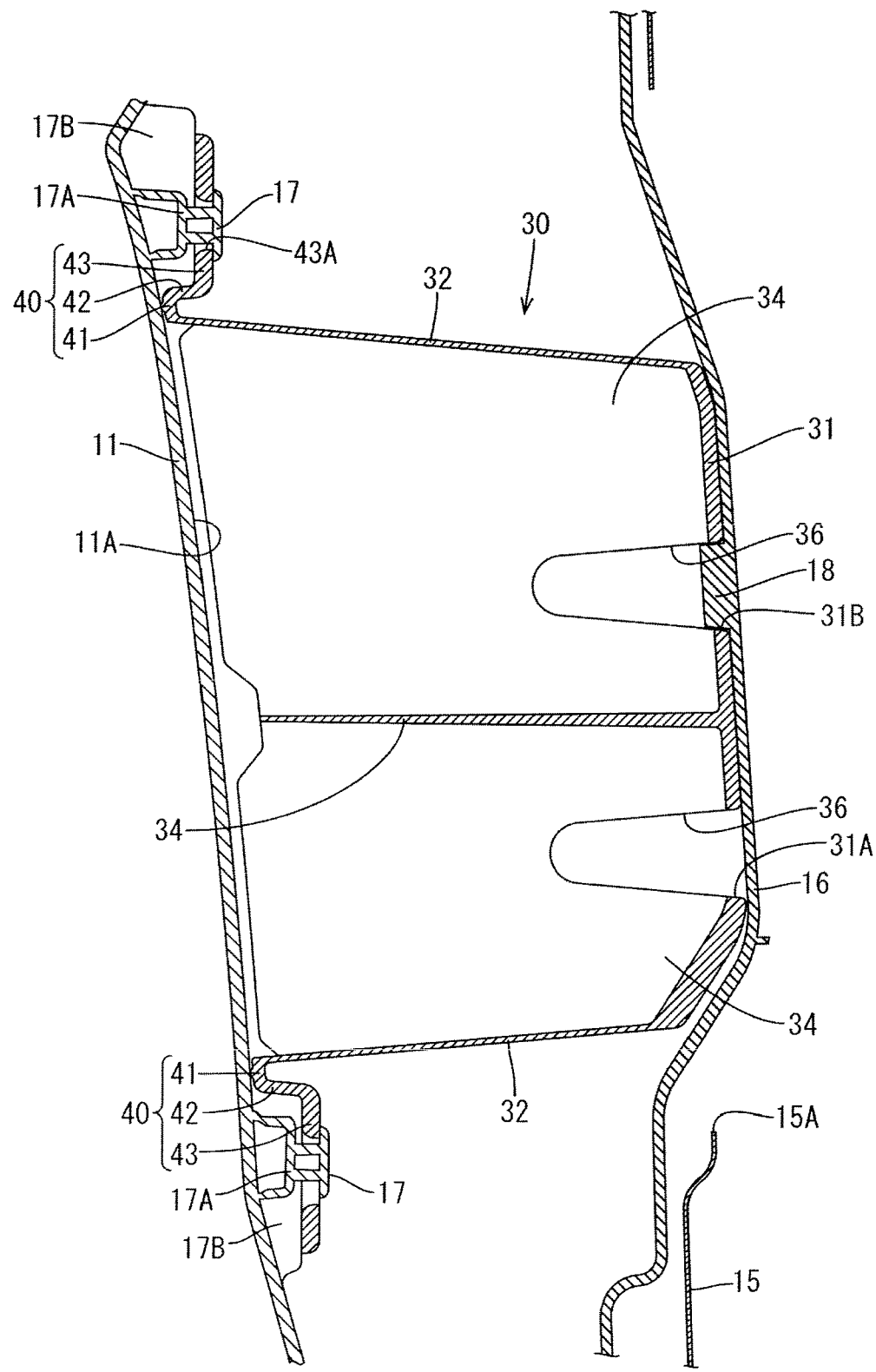
FIG. 7 is a cross-sectional view illustrating the impact absorber in case of a side collision.

As illustrated in FIG. 7, the projection 18 is fit in the through hole 31B in case of the side collision such that the impact absorber 30 is positioned with respect to the service hole cover 16. Namely, the projection 18 and the trough hole 31B function as a positioning structure of positioning the impact absorber 30.

As described before, the impact absorber 30 of this embodiment is disposed between the service hole cover 16 and the trim board 11 covering the service hole cover 16 from the vehicular interior side. The impact absorber 30 includes the opposite wall 31 that is opposite the service hole cover 16, the outer walls 32 extending from the edges of the opposite wall 31 toward the vehicular interior side, and the extended wall 33 extending from the opposite wall 31 toward the vehicular interior side and connected to the respective outer walls 32 at the outer wall-side edge portions thereof. The extended wall 33 is thicker as they extend from the vehicular interior side ends toward the vehicular exterior side. The extended wall 33 has the cutout hole 36 that is open toward the vehicular exterior side.

In case of the side collision of a vehicle, the extended wall 33 is buckled and deformed to absorb impact. As the extended wall 33 is buckled furthermore, the bent extended wall may be hit each other and further deformation thereof may be obstructed. Thus, the impact absorbing performance may be lowered. With a configuration that the extended wall has a thickness that increases as it extends from the vehicular interior side edge thereof toward the vehicular exterior side, the dies can be easily separated from each other when molding the extended walls with injection molding. However, the buckling deformation of the extended walls is likely to occur from the distal end side portions of the extended walls having a smaller thickness. As the extended walls are further buckled and deformed, relatively thick portions of the extended walls (the vehicular exterior side portion) will be deformed. According to the further buckling deformation of the extended wall portions, the relatively thick portions of the respective extended walls (the vehicular exterior-side portions) are to be deformed. However, the relatively thick portions are less likely to be deformed and the impact absorbing performance may be lowered.

In this embodiment, the extended wall 33 includes the cutout hole 36 that is open toward the vehicular exterior side. Therefore, the vehicular exterior side end portions of the extended wall 33 that are thick are easily deformed, and the impact absorbing performance is less likely to be lowered in the further buckling deformation of the extended wall 33.

As illustrated in FIG. 5, the cutout hole 36 is through the thickness of the extended wall 33 and is open toward the vehicular exterior side, and the cutout hole 36 has an opening width B1 that increases as is closer to the vehicular exterior side. As described before, the thickness of the extended wall 33 is increased as the extended wall 33 extends from the vehicular interior side end toward the vehicular exterior side. With this configuration, the extended wall 33 is less likely to be deformed according to the further buckling and deformation.

However, in this embodiment, the opening width B1 of the cutout hole 36 is increased as it extends toward the vehicular exterior side. Namely, the opening width B1 of the cutout hole 36 is increased as the thickness of the extended wall 33 is increased. Accordingly, the likeliness of deformation of the extended wall 33 that will be a load applied on a passenger can be substantially even from an initial stage to an end stage of a vehicle's impact. In FIG. 5, a component 136 with a two-dot chain line illustrates a component included in a second embodiment.

The impact absorber 30 of this embodiment includes the mounting portions 40 that are to be fit to the respective mounting bosses 17 formed on the vehicular exterior side surface of the trim board 11. The mounting portions 40 are included at the vehicular interior side ends of the respective outer walls 32 and each of the mounting portions 40 includes the basal portion 41 that is in contact with the vehicular exterior side surface of the trim board 11, the distal end portion 43 that is on the vehicular exterior side with respect to the basal portion 41 and to be secured to the mounting boss 17, and the intermediate portion 42 that connects the basal portion 41 and the distal end portion 43.

In case of a collision of a vehicle, the opposite wall 31 is pressed from the vehicular exterior side and the outer walls 43 are deformed. The basal portion 41 is located on the vehicular interior side with respect to the distal end portion 43 that is to be secured to the mounting boss 17. With such a configuration, the outer wall 32 is deformed while the basal portion 41 being as a fixed point and the stress is concentrated on the basal portion 41. Therefore, the outer wall 32 is deformed and bent at the basal portion 41. The stress or a load is less likely to be applied to the securing portion of the impact absorber 30 (the distal end portion 43 and the mounting boss 17) when the outer wall 32 is deformed. Thus, the securing portion of the impact absorber 30 is less likely to be damaged or broken. The impact absorber can be positioned correctly with respect to the passenger in case of a collision of a vehicle.

In this embodiment, as illustrated in FIGS. 5 and 7, the outer walls 32 are slanted toward the inside of the impact absorber 30 as they extend toward the vehicular exterior side and the molding dies are easily released. However, with such slanted outer walls 32, the outer walls 32 are likely to be deformed in case of a side collision such that the vehicular exterior side end portion of the outer wall 32 moves inside the impact absorber 30. An outer wall 32A that is being deformed is illustrated with a dot and dash line in FIG. 6.

If a distal end portion 43B illustrated with a dot and dash chain line in FIG. 6 is directly connected to the outer wall 32, a great load is applied on the mounting boss 17 and the distal end portion 43B according to the deformation of the outer wall 32. Further, the distal end portion 43B is deformed to be away from and removed from the mounting boss 17 according to the deformation of the outer wall 32. Therefore, the mounting boss 17 and the distal end portion 43 may be broken. In this embodiment, such problems are less likely to occur because the outer walls 32 are deformed and bent at the basal portions 41.

The basal portion 41 includes the plate portion 44 that extends along the vehicular exterior side surface of the door trim 11 and the elongated contact rib 45 that is formed on the vehicular interior side surface of the plate portion 44. The contact rib 45 is in contact with the vehicular exterior side surface of the trim board 11. The contact rib 45 is smaller than the plate portion 44 and a dimension error thereof is likely to be smaller. Therefore, the contact rib 45 can be more surely in contact with the vehicular exterior side surface of the trim board 11 in comparison to a configuration that the plate portion 44 comes in contact with the vehicular exterior side surface.

The service hole cover 16 includes the projection 18 that projects toward the through hole 31B of the trim board 11 and to be fit in the through hole 31B. The projection 18 and the through hole 31B overlap each other seen from the vehicular interior side. With the projection 18 and the through hole 31B overlapping each other seen from the vehicular interior side, the projection 18 is fit in the through hole 31B in case of a collision of a vehicle. Accordingly, the opposite wall 31 is less likely to be moved along a plane thereof due to the impact of the collision. Therefore, the impact absorber 30 is less likely to be shifted from a correct position with respect to the passenger. A desired impact absorbing performance can be set by altering a size or a shape of the through hole 31B formed in the opposite wall 31 of the impact absorber 30.

<Second Embodiment>

A second embodiment will be described with reference to FIG. 8. In this embodiment, an impact absorber has a configuration different from that of the above embodiment. The same numbers and symbols are provided on components same as those of the above embodiment and the same components will not described.

Figure 8:
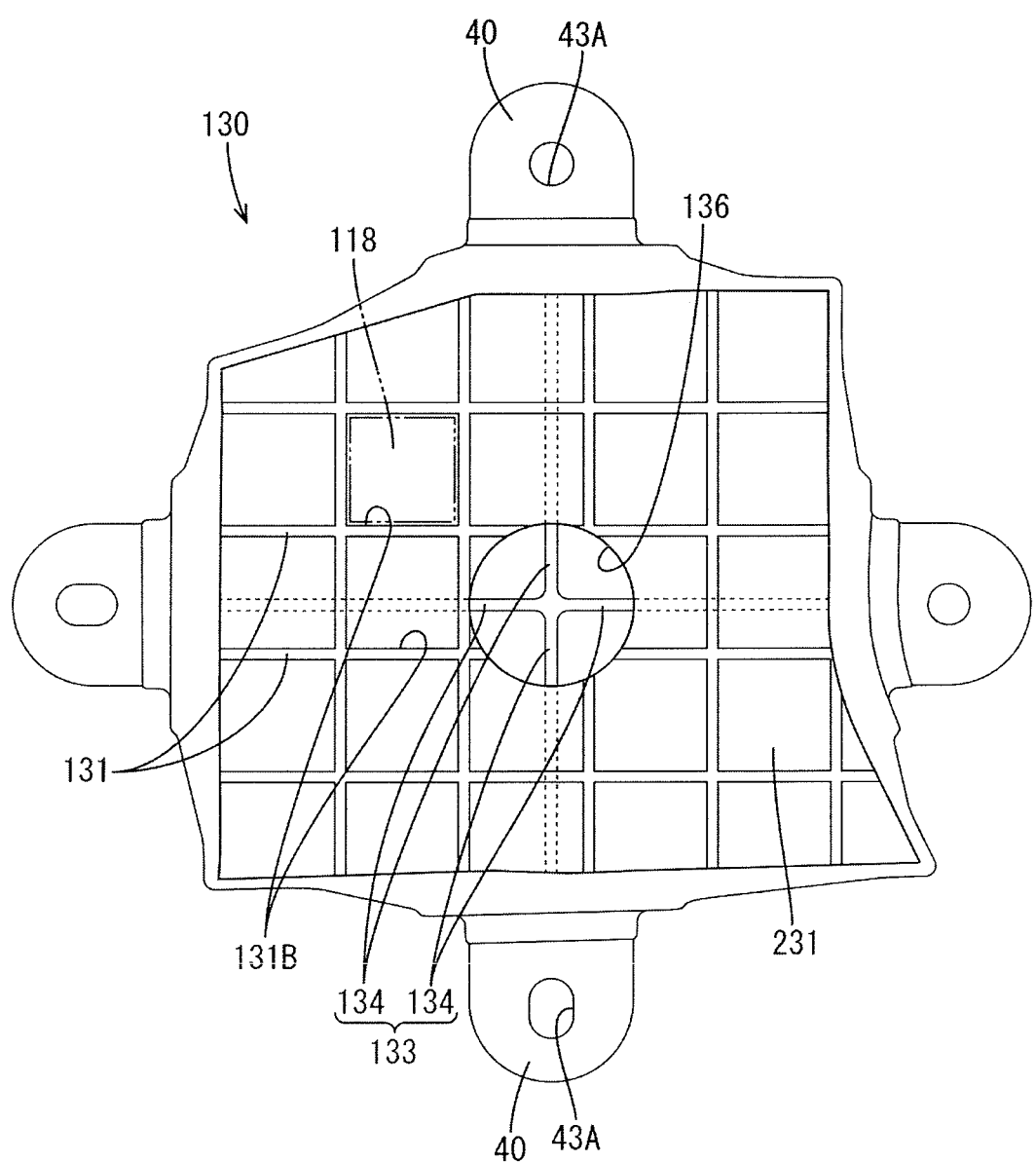
FIG. 8 is a front view of an impact absorber according to a second embodiment seen from the vehicular exterior side.

As illustrated in FIG. 8, an impact absorber 130 of this embodiment includes four ribs 134 and a cutout hole 136 at a connecting section of the four ribs 134. The cutout hole 136 of the second embodiment is also described with a two-dot chain line in FIG. 5. Ribs 131 formed in a grid are formed on a vehicular exterior side surface of the opposite wall 231. The opposite wall 231 includes recessed portions 131B (fitting portions) surrounded by the ribs 131.

Each of the recessed portions 131B has a square shape seen from the vehicular exterior side and the recessed portions 131B are arranged in columns and rows on the vehicular exterior side surface of the opposite wall 231. One of the recessed portions 131B is opposite a projection 118 formed on the service hole cover 16, which is not illustrated in FIG. 8. The projection 118 is illustrated with a two-dot chain line in FIG. 8. According to such a configuration, even if the position of the projection 118 is shifted from the opposing recessed portion 131B in case of a collision of a vehicle, any one of the recessed portions 131B near the opposing recessed portion 131B may be fit to the projection 118. Thus, the opposing wall 231 can be positioned with respect to the passenger.

In this embodiment, an extended wall 133 includes four ribs 134 that are connected to each other in a form of a cross seen from the vehicular interior side. Accordingly, each of the ribs can be surely buckled and the impact absorbing performance is improved. The cutout hole 136 is formed at the connecting section of the four ribs 134 and the cutout hole 136 is through thickness of each of the four ribs 134 and open toward the vehicular exterior side. Therefore, the vehicular exterior side end portions of the respective ribs 134 that are thick are easily deformed, and the impact absorbing performance is less likely to be lowered in the further buckling deformation of the extended wall 133. In this embodiment, the opening width of the cutout hole 136 is increased as it extends toward the vehicular exterior side similarly to the first embodiment. Namely, the opening width of the cutout hole 136 is increased as the thickness of the extended wall 133 is increased. Accordingly, the likeliness of deformation of the extended wall 133 that will be a load applied on a passenger can be substantially even from an initial stage to an end stage of a vehicle's impact.

In this embodiment, one cutout hole 136 is formed in the extended wall 133 and therefore, the number of positions where the holes are to be formed is reduced. Therefore, in molding the extended wall with injection molding, shapes of the molding dies can be simplified in comparison to a configuration that each rib 134 has a hole.

<Other Embodiments>

The present technology is not limited to the description as described above with reference to the drawings. For example, the present technology may include following embodiments.

(1) In the above embodiments, the service hole cover 16 may have a through hole and the opposite wall 31 may include a projection.

(2) In the above embodiments, the service hole cover 16 is included as a vehicular panel opposite the impact absorber. However, it is not limited thereto. For example, the inner panel 15 may be used as the vehicular panel opposite the impact absorber and the inner panel 15 may include a projection.

(3) In the above embodiments, the basal portion 41 may not include the contact rib 34. The plate portion 44 may be in contact with the vehicular exterior side surface of the trim board 11.

(4) In the above embodiments, in a normal state, the projection 18 is not fit in the through hole 31B and is fit in the through hole 31B in case of a side collision. The projection may be fit in the through hole in a normal state. With such a configuration, the projection is surely fit in the through hole in case of a collision of a vehicle. However, if the projection 18 is fit in the through ole 31B in a normal state, the projection 18 may be in contact with an inner surface of the through hole 31B due to vibration caused by the vehicle's running and noise may be caused. In the above embodiments, the projection 18 is not fit in the through hole 31B and therefore, noise may not be caused.

(5) In the first embodiment, the opposite wall 31 may not include through holes 31A that do not opposite the projection. However, with the configuration that the opposite wall 31 includes through holes 31A that do not opposite the projection 18, molding dies for molding the impact absorber 30 having the cutout holes 36 have a simple structure.

(6) In the above embodiments, the mounting boss 17 is secured to the mounting portion 40 with welding. However, it is not limited thereto. For example, the mounting portion 40 may be secured to the mounting boss 17 with securing means such as screws. With the configuration that the mounting boss 17 is secured to the mounting portion 40 with welding, the number of components is reduced in comparison to the configuration using the screws. However, securing strength is lowered. In the above embodiments, the securing portion may not be broken even with the low securing strength with a configuration that the mounting boss 17 is secured to the mounting portion 40 with welding because the load acting on the securing portion with the mounting portion 40 is reduced.

(7) A shape or a size of the cutout hole 36 may be altered as appropriate.

(8) The extended wall 33 may not have a cross shape in a front view but may have a different shape as appropriate.

The invention claimed is:

1. An impact absorber to be mounted between a vehicular panel and a vehicular interior part covering the vehicular panel from a vehicular interior side, the impact absorber comprising:
an opposite wall to be opposite the vehicular panel;
outer walls extending from edges of the opposite wall toward a vehicular interior side; and
an extended wall extending from the opposite wall toward the vehicular interior side and having a side edge connected to one of the outer walls, and the extended wall having a thickness that is increased from a vehicular interior end thereof toward a vehicular exterior end thereof, and the extended wall having a cutout hole that is open toward a vehicular exterior side.

2. The impact absorber according to claim 1, wherein the extended wall includes ribs extending from a vehicular interior side surface of the opposite wall and each of the ribs has the cutout hole.

3. The impact absorber according to claim 2, wherein the opposite wall has through holes each of which is communicated with the cutout hole of each rib.

4. The impact absorber according to claim 3, wherein the cutout hole is through a thickness of each rib and open toward the vehicular exterior side at a connecting section of each rib and the opposite wall.

5. The impact absorber according to claim 4, wherein the cutout hole has an opening width that is increased toward the vehicular exterior side.

6. The impact absorber according to claim 3, wherein the cutout hole has an opening width that is increased toward the vehicular exterior side.

7. The impact absorber according to claim 2, wherein the cutout hole is through a thickness of each rib and open toward the vehicular exterior side at a connecting section of each rib and the opposite wall.

8. The impact absorber according to claim 2, wherein the cutout hole has an opening width that is increased toward the vehicular exterior side.

9. The impact absorber according to claim 2, wherein:
each of the ribs has an outer edge and an inner edge,
the outer edge is connected to one of the outer walls, and inner edges of the ribs are connected to each other.

10. The impact absorber according to claim 1, wherein the cutout hole is through a thickness of the extended wall and open toward the vehicular exterior side at a connecting section of the extended wall and the opposite wall.

11. The impact absorber according to claim 10, wherein the opposite wall has a through hole that is communicated with the cutout hole.

12. The impact absorber according to claim 11, wherein the through hole is to be fit to a projection formed on the vehicular panel.

13. The impact absorber according to claim 11, wherein:
the cutout hole includes multiple cutout holes,
the through hole includes multiple through holes, and
each of the cutout holes is communicated with a corresponding one of the through holes.

14. The impact absorber according to claim 1, wherein the cutout hole has an opening width that is increased toward the vehicular exterior side.

15. The impact absorber according to claim 1, wherein the extended wall includes at least four ribs connected to each other in a form of a cross shape seen from the vehicular interior side, and
the cutout hole is at a connecting section of the at least four ribs.

16. The impact absorber according to claim 1, further comprising mounting portions at extended ends of the respective outer walls, each of the mounting portions including a contact rib that is to be in contact with the vehicular interior part and a securing portion that is to be secured to a mount portion of the vehicular interior part, and the securing portion being on the vehicular exterior side than the contact rib.

17. The impact absorber according to claim 1, wherein the extended wall includes four ribs each extending from the opposite wall and each of the ribs has a thickness that is increased from the vehicular interior end thereof toward the vehicular exterior end thereof, the four ribs are connected to form in a cross shape, and each of the four ribs has the cutout hole.

\* \* \* \* \*